3,131,759
METHOD OF TREATING OIL-PRODUCTIVE
SUBTERRANEAN FORMATIONS
Marion L. Slusser, Arlington, Malcolm K. Strubhar,
Irving, and Edwin E. Glenn, Jr., Dallas, Tex., assignors, by mesne assignments, to Socony Mobil Oil Company, Inc., New York, N.Y., a corporation of New York
No Drawing. Filed June 19, 1959, Ser. No. 821,371
16 Claims. (Cl. 166—2)

This invention relates to production of petroleum from subterranean formations and relates more particularly to a method for increasing the flow capacity of a subterranean formation to petroleum oil.

Petroleum oil is produced from a petroleum-containing formation by flow of the oil from the formation to a well borehole drilled from the surface of the earth to the formation. Flow of oil from the formation to the well borehole depends, among other factors, upon the flow capacity of the formation to the oil. Oil productive formations usually contain water in addition to the oil. The flow capacity of the formation to the oil is dependent, among other things, upon the distribution of the water and oil phases within the pore channels of the formation. The distribution of the two liquid phases does not necessarily remain constant and may vary from time to time as oil is produced from the formation. Often, the flow capacity of the formation may become undesirably low and measures are required to be taken in order to increase the flow capacity. Various procedures have been proposed for increasing the flow capacity but, while these procedures are effective for the purposes intended, they leave much to be desired.

It is an object of this invention to increase the flow capacity of a subterranean formation to petroleum oil. It is another object of this invention to change the distribution of the water and oil phases within an oil-productive subterranean formation. Further objects of the invention will become apparent from the following detailed description.

In accordance with the invention, a subterranean formation productive of petroleum oil and containing an oil phase and a water phase is treated by a procedure which involves injecting into the formation a solvent which has mutual solubility for oil and water and injecting into the formation liquid water. Injection into the formation is through a well borehole leading to the formation and production of petroleum oil from the formation following the procedure is from this well borehole. The liquid water may be injected simultaneously with the solvent which has mutual solubility for oil and water or may be injected separately before or after the injection of the solvent. The procedure also involves injecting into the formation, prior to the solvent which has mutual solubility for oil and water, a liquid which has particular solubility for petroleum oil or derivatives of petroleum oil. The procedure further involves dissolving a surfactant in one or more of the solvent, the water, or the liquid which has particular solubility for petroleum oil or petroleum oil derivatives injected into the formation.

Our invention is based upon the concept that the flow capacity of a porous medium to a given phase at a given saturation is higher to a nonwetting phase than to a wetting phase at the same saturation. As stated, an oil productive formation contains water as well as oil. Where the surfaces of the interstices of the porous subterranean formation are wetted, i.e., covered, with oil, the water in the formation, if relatively small in amount, will exist as discrete drops in the tortuous interstices, or pore channels, of the formation. These drops collected in the pore channels and act as check valves at constrictions in the pore channels, with the result that the flow capacity of the formation to the oil is reduced. Where the amount of the water in the formation is relatively great, the drops become connected and form a continuous aqueous phase within the pore channels. This phase may occupy the major portion of the volume of the pore channels and, under these circumstances, the flow capacity of the formation to oil becomes negligible.

By the procedure of the invention, the surfaces of the subterranean formation productive of petroleum oil are rendered water-wet. With the pore channels water-wet, the water in the formation distributes itself on the surfaces of the pore channels. As a result, the area of the pore channels available for oil flow is at a maximum and there are no droplets of water at constrictions in the flow channels to act as check valves. The oil in the formation is enabled to flow through the central portion of the flow channels through a liner of water. Thus, the flow capacity of the formation to the oil is at a maximum.

The injection into the formation of the solvent which has mutual solubility for oil and water dissolves the oil contained within the formation. It also dissolves the water although, as will become apparent hereinafter, the extent to which it dissolves water need not be as great as the extent to which it dissolves oil. As the solvent which has mutual solubility for oil and water is injected into the formation, there is produced in the formation a liquid phase consisting of a solution of oil, and water, in the solvent having mutual solubility for oil and water. This liquid phase will exist as a transitional zone within the formation with its leading face adjacent to the portion of the formation containing oil and water. As the solvent having mutual solubility for oil and water is injected into the formation, the leading edge of the transitional zone will advance into the formation and will be followed at its trailing edge by the injected solvent. Thus, the oil will be stripped from the surfaces of the pore channels of the formation and will be replaced by the solution forming the transitional zone or the solvent having mutual solubility for oil and water.

The solution forming the transitional zone will, from point to point in the transitional zone, vary in its concentration of dissolved oil. At the leading edge of the transitional zone, the solution will contain the largest concentration of dissolved oil and at the trailing edge will contain the lowest concentration of dissolved oil. Accordingly, the transitional zone, at any portion thereof, with the possible exception of the extreme leading edge, will be miscible with at least some water and therefore can be displaced by water from the surfaces of the pore channels of the formation. Liquid water can thus displace at least a portion of the solution forming the transitional zone, as well as solvent having mutual solubility for oil and water, from the surfaces of the pore channels of the formation and contact the surfaces of the pore channels of the formation. Accordingly, these portions of the formation become water-wetted. The water is then the wetting phase and the flow capacity of the formation to oil, the nonwetting phase, will be at a maximum.

The liquid water injected into the formation provides the water to render the formation water-wet. As stated, the liquid water may be injected into the formation prior to the solvent. It may also be injected into the formation simultaneously with the solvent. Alternatively, it may be injected into the formation subsequent to the solvent.

Where the liquid water is injected into the formation prior to the solvent which has mutual solubility for oil and water, part, but not all, of the petroleum oil in the formation will be displaced from its original position in the formation and replaced by the injected water. Thus, the amount of the oil in the formation will be reduced. The remaining oil will be the oil covering the surface of the interstices of the formation. The remainder of the liquid content of the formation will be the injected water. This injected water, upon subsequent injection of the solvent having manual solubility for oil and water, will, for the most part, be displaced and, to a lesser extent, dissolved. Thus, at the leading edge of the transitional zone there will be a zone of liquid water. This liquid water will be capable of wetting, upon contacting therewith, those portions of the formation contacted by the transitional zone and the solvent having mutual solubility for oil and water. Upon subsequent flow of liquids through the formation to the well borehole, this zone of water will contact the portions of the formation previously contacted by the transitional zone and the solvent and, accordingly, will wet these portions of the formation with water.

Where the water is injected into the formation simultaneously with the solvent having mutual solubility for oil and water, it is preferred that the solvent have a greater affinity for oil than for water. In this method of operation, the water and the solvent are in the form of a homogenous solution. As this solution passes into and through the formation, it contacts the oil and water within the formation. Since the solvent having mutual solubility for oil and water will have a greater solubility for oil than for water, it preferentially dissolves the oil. Concomitantly with solution of the oil, the amount of water which can be in solution in the solvent decreases. Eventually, the solubility for water decreases to the point that water previously dissolved in the solvent will precipitate from solution. This precipitated water, as well as water initially in the formation, but unable to contact the walls of the formation because of the oil film thereon, is able to contact the walls of the formation. The walls of the formation thus become wetted with water.

Where the water is injected into the formation subsequent to the solvent having mutual solubility for oil and water, the transitional zone and the solvent will be displaced by the injected water. Thus, the surfaces of the pore channels of the formation are contacted with the liquid water. As a result, they become water-wetted. The injection of the water into the formation subsequent to the solvent provides a positive replacement of the transitional zone and the solvent with liquid water. It is thus preferred, regardless of whether the step of injecting water into the formation prior to the solvent or the step of injecting water into the formation simultaneously with the solvent is employed, to employ the step of injecting water into the formation subsequent to the solvent.

Upon flow of oil thereafter through the portions of the formation thus wetted by water, these portions will retain their water-wet characteristics. The oil, not being miscible with water, will not displace the water from the surfaces of the pore channels of the formation. The solution forming the transitional zone is, of course, capable of displacing water. However, only that portion of the transitional zone that contains the lower concentrations of dissolved oil is capable of displacing water. Those portions of the transitional zone containing the higher concentrations of dissolved oil, being saturated with oil or approaching saturation with oil, are limited in the extent to which they can dissolve any further solute, either oil or water, and therefore will not be capable of displacing water.

In practice, the pattern of flow outward from a well bore is divergent. A three foot band of solvent around a well bore having a diameter of six inches is reduced to a six inch band at a distance of about ten feet from the well bore. In such a thin transitional zone, the solvent can be for all practical purposes saturated with oil and will thereby lose its solvency for water. Stated otherwise, the amount of solvent having mutual solubility for oil and water in the transitional zone that is available for displacing water from the water-wetted portion of the formation is reduced in proportion to the amount of oil that has been dissolved in the solvent. As a net result, a portion of the formation necessarily remains water-wet.

The magnitude of the portion of the formation rendered water-wet by the procedure of the invention will depend upon both the amount and the character of the solvent having mutual solubility for oil and water that is employed. With a greater amount of solvent having mutual solubility for oil and water, the oil can be removed from a greater portion of the formation and thus a greater portion of the formation will be rendered water-wet. Where the solvent having mutual solubility for oil and water is one in which the oil solubility is greater than the water solubility, it will be capable of displacing more oil than water from the formation for any given ratio of oil and water in the formation. Thus, employing equal amounts of two solvents having mutual solubility for oil and water, the solvent having the greater solubility for oil will dissolve the oil in a larger portion of the formation. Further, the solvent having greater solubility for oil than water will form a transitional zone which, passing through a portion of the formation rendered water-wet, will be capable of dissolving less of the water contacting the surfaces of the pore channels in this portion of the formation. Thus, a greater portion of the formation which has been rendered water-wet will remain in this condition. Therefore, irrespective of whether the liquid water is injected into the formation prior or subsequent to, or simultaneously with the solvent, it is preferred to employ, as the solvent having mutual solubility for oil and water, on which has a greater ability to dissolve oil than to dissolve water.

The magnitude of the portion of the formation rendered water-wet will depend also upon the amount of water employed. For any given amount of solvent having mutual solubility for oil and water, a greater amount of water will displace a greater amount of this solvent and of solution forming the transitional zone. Thus, a greater portion of the formation will have the solution which forms the transitional zone, or the solvent having mutual solubility for oil and water, displaced from it and contacted with water.

While the amount of the solvent having mutual solubility for oil and water employed is a factor involved in connection with the magnitude of the portion of the formation rendered water-wet, it is preferred to employ the smallest amount of this solvent consistent with the volume of formation to be treated. As previously indicated, upon flow of oil to the well through the portions of the formation treated by the process of the invention, only those portions of the transitional zone containing the lower concentrations of dissolved oil will displace the water from the water-wetted portions of the formation. Thus, the greatest effectiveness of treatment is obtained where the solvent having mutual solubility for oil and water forms a transitional zone containing large amounts of dissolved oil. This will occur where, for any given volume of formation to be treated and for any given amount of oil and water in the formation, the smallest amount of solvent having mutual solubility for oil and water is employed.

The amount of solvent having mutual solubility for oil and water and the amount of water to be employed will also depend, other things being equal, upon the volume of the formation to be treated. The volume of formation treated will be a function of the distance the two liquids are injected into the formation from the well borehole. Sufficient solvent and water should be employed to render the formation water-wet for a distance of at least one foot from the well borehole. Desirably, sufficient solvent and water should be employed to render the formation water-wet for a distance of at least five feet from the well borehole. Greater amounts of solvent and water can be employed. Preferably, amounts to wet the formation with water for a distance of seven feet from the well borehole should be employed. Amounts sufficient to wet the formation with water to a distance of fifteen or twenty feet can also be employed.

Where the water and the solvent having mutual solubility for oil and water are injected simultaneously into the formation, the amount of water admixed with the solvent will depend upon the ratio of oil to water in the formation. Where the ratio of oil to water in the formation is large, a large amount of water will be dissolved in the solvent. On the other hand, where the ratio of water to oil in the formation is large, the amount of water dissolved in the solvent will be lower. Generally, where water and the solvent having mutual solubility for oil and water are injected simultaneously into the formation, the solution may contain about equal proportions of water and of solvent having mutual solubility for oil and water.

Any type of solvent having mutual solubility for oil and water may be employed. Solvents of this type are organic compounds. Solubility for oil requires that the compound contain a hydrocarbon group. Solubility for water requires that the compound contain a polar group.

A system of classifying organic compounds based upon solubility in various liquids has been developed. This classification has been described, for example, by Shriner and Fuson in "The Systematic Identification of Organic Compounds," 8th Edition, John Wiley & Sons, Inc. (1940). One class of compounds described by these authors is identified by them as class $S_1$. In this class are the compounds which are soluble in water and in ether. Solubility in benzene can be substituted for solubility in ether. A compound is regarded as being soluble if 0.2 cubic centimeter of the solute will dissolve in 3 cubic centimeters of the solvent at room temperature. Compounds in this class $S_1$ can be employed in the practice of the invention as solvents having mutual solubility for oil and water.

Particular compounds which have been found to be useful include:

Methyl alcohol,
Ethyl alcohol,
Propyl alcohol,
Isopropyl alcohol,
n-Butyl alcohol,
Isobutyl alcohol,
Tertiary butyl alcohol,
2-pentyl alcohol,
Tertiary amyl alcohol,
Dichloro tertiary butyl alcohol,
Allyl alcohol,
Ethylene glycol,
Propylene glycol,
Diethylene glycol,
Butyl glycol,
Tetraethylene glycol,
Dipropylene glycol,
Tripropylene glycol,
Dioxane,
Ethylene glycol monomethyl ether,
Ethylene glycol monoethyl ether,
Ethylene glycol monopropyl ether,
Ethylene glycol monobutyl ether,
Ethylene glycol monophenyl ether,
Propylene glycol methyl ether,
Diethylene glycol n-butyl ether,
Dipropylene glycol monomethyl ether,
Tripropylene glycol monomethyl ether,
Ethylene glycol dimethyl ether,
Diethylene glycol dimethyl ether,
Triethylene glycol dimethyl ether,
Tetraethylene glycol dimethyl ether,
Glycerol triacetate,
Methyl acetate,
Diethylene glycol monoethyl ether,
Methyl acetoacetate,
Acetone,
Methyl ethyl ketone,
Trichloro acetaldehyde (chloral),
Pyridine, and
Acrylaldehyde (acrolein).

Of these solvents, it is preferred to employ either ethylene glycol monomethyl ether, ethylene glycol monoethyl ether, ethylene glycol monobutyl ether, tertiary butyl alcohol, or diethylene glycol monoethyl ether.

A single solvent having mutual solubility for oil and water may be preferred. On the other hand, mixtures of solvents having mutual solubility for oil and water may be employed. A mixture of solvents has particular use where a solvent, because of economic considerations or otherwise, is desirable for use but its solubility for water is not as high as might be desired. In such cases, the addition of another solvent having a higher solubility for water will provide a mixture having an improved solubility for water. With such a mixture, a smaller quantity of solvent will be capable of treating a given volume of formation around the well borehole. A preferred mixture is one containing ethylene glycol monobutyl ether and ethylene glycol monomethyl ether.

In a preferred embodiment of the invention, there is injected into the formation, prior to the solvent which has mutual solubility for oil and water, a liquid which has particular solubility for petroleum oil or derivatives of petroleum oil. By petroleum oil derivatives, we mean such materials as waxes and asphaltic compounds which will deposit as such in the formation from the petroleum oil. Petroleum oil and petroleum oil derivatives, while generally soluble in solvents having mutual solubility for oil and water, are more soluble in various solvents which do not have mutual solubility for oil and water. Further, these liquids which have particular solubility for petroleum oil or petroleum oil derivatives are more soluble in solvents having mutual solubility for oil and water than petroleum oil or petroleum oil derivatives. By first injecting into the formation a liquid which has particular solubility for petroleum oil or petroleum oil derivatives, the petroleum oil and petroleum oil derivatives are dissolved in the liquid. Thus, an oil solvent zone formed of a solution of this liquid and the dissolved petroleum oil and petroleum oil derivatives will be present in the formation. Depending upon the amount of this liquid employed, the trailing edge of this zone will be in contact with a liquid phase composed solely of this liquid. The solution and the liquid phase, if the latter is present, will be more readily soluble in the solvent having mutual solubility for oil and water than the petroleum oil and petroleum oil derivatives. Thus, the petroleum oil and petroleum oil derivatives are first washed from the formation with the liquid having particular solubility for these materials and are replaced with the liquid. The liquid is more readily soluble in the solvent having mutual solubility for oil and water than the petroleum oil and petroleum oil derivatives. Therefore, depending upon the amount of liquid having particular solubility for petroleum oil or petroleum oil derivatives that is used, the amount of solvent having mutual solubility for oil and water required to treat any particular volume of formation is proportionately reduced.

Various types of liquids having particular solubility for petroleum oil and petroleum oil derivatives may be employed. These liquids include xylene, carbon disulfide, phenol, benzene, toluene, trichloroethane, tetranaphthalene, decahydronaphthalene, carbon tetrachloride, gasoline, and kerosene. Preferably, aromatic liquids are employed. Of these, xylene is preferred.

In the practice of the invention, the liquid having mutual solubility for oil and water is injected into the formation following the liquid having particular solubility for petroleum oil or petroleum oil derivatives. By this is meant that the solvent having mutual solubility is injected into the formation after the liquid having particular solubility for petroleum oil or petroleum oil derivatives without any other liquid having been injected into the formation between the solvent and this liquid. Similarly, the water, when not employed prior to or in admixture with the solvent having mutual solubility for oil and water, is injected into the formation following the solvent. Here again, it is intended that no liquid is injected into the formation between the mutual solvent and the water. In the event that oil contacts the formation immediately following injection of the solvent having mutual solubility for oil and water, the injection of solvent having mutual solubility for oil and water must be repeated.

The water injected into the formation may be any water available. This water may be purified water such as distilled water, water treated by ion exchange, or water otherwise treated to change the quantity or kind of dissolved constituents. On the other hand, purified water is rarely available at well sites and, where such water is unavailable, whatever water is available at the site may be employed. This water may be surface water such as pond, lake, or river water, or may be ground water such as well or spring water. These waters will contain various dissolved constituents such as one or more of the metallic ions such as sodium, calcium, potassium, magnesium, silicon, aluminum, and iron and the non-metallic ions such as chloride, sulfate, carbonate, bicarbonate, nitrate, phosphate, borate, and sulfide. Sea water may also be used. The predominant dissolved material in sea water will be sodium chloride and the sodium chloride will be in concentration of the order of three percent by weight. Filtration or other treatment of the water to remove solids may be employed.

Various petroleum containing formations contain clay which has a tendency to swell when contacted with water. In the treatment of such formation by the process of the invention, it is preferred to employ water containing a flocculent for clay. The flocculent may be any of those commonly employed for the treatment of clay such as those used in the treatment of clay in drilling fluids or in subterranean formations. The flocculent serves to decrease the swelling of the clay upon contact with water. A suitable flocculent is an electrolyte. Included among these electrolytes are sodium chloride, sodium sulfate, calcium chloride, calcium sulfate, magnesium chloride, and magnesium sulfate. Preferably, calcium chloride or sodium chloride is employed. Of course, where there is uncertainty as to whether a formation to be treated contains clay, a flocculent may be added to the water since the flocculent will have no adverse effect on the flow capacity of the formation to oil.

In another preferred embodiment of the invention, a surfactant is dissolved in either or in each of the solvent having mutual solubility for oil and water, the water, or the liquid which has particular solubility for petroleum oil or petroleum oil derivatives prior to injection into the formation. Thus, the solvent having mutual solubility for oil and water, the water, whether or not in admixture with solvent, or the liquid having particular solubility for petroleum oil or petroleum oil derivatives, or any two or all three of these materials, will contain a surfactant dissolved in them prior to being injected into the formation. The presence of the surfactant lowers the interfacial tension between the material in which it is contained and whatever phase is already present in the formation. As a result, the phase already in the formation is more readily displaced from the formation.

Any type of surfactant soluble in the liquid in which it is used may be employed. By surfactant, we mean any compound which has the property of reducing the surface tension of the solvent in which it is dissolved and adsorbing on a surface such as that of a solid or distributing itself at an interface between two liquid phases. The surfactant has a molecular structure containing a nonpolar and a polar group. A nonpolar group will ordinarily be a hydrocarbon group. The polar group will be hydrophilic. This characteristic of surfactants is shared with solvents having mutual solubility for oil and water. However, a surfactant may be distinguished from a mutual solvent for oil and water. The term surfactant is logically reserved for those compounds which in small quantities cause large decreases in interfacial tension between an aqueous phase and an oil phase. An illustration may be made as follows. Consider a given family of organic compounds whose composition is changed by the addition of hydrophilic groups onto the molecule. The solubility of the resultant compounds varies from infinite solubility in oil and zero solubility in water to zero solubility in oil and infinite solubility in water. The following generalization may be made concerning the surface activity of these compounds of the same family. The most effective surface active compound is the one that has the minimum total solubility in oil and water. In other words, this compound is the one that concentrates itself mainly in the interface between the two phases.

The surfactant, as indicated, will be one which is soluble in the liquid in which it is employed. The surfactant employed in the solvent having mutual solubility for oil and water may be oil-soluble or water-soluble. The surfactant employed in the water will, of course, be water-soluble. The surfactant employed in the solvent having particular solubility for petroleum oil and petroleum oil derivatives will be, in the main, oil-soluble. The surfactants may be nonionic, cationic, or anionic.

Water-soluble, nonionic surfactants which may be employed include the oxalkylene ethers of various alkyl, aryl, alkaryl, and aralkyl hydrocarbons. For example, there may be employed the oxyethylene or oxypropylene ethers of various hydrocarbon groups containing 6–15 carbon atoms. Other surfactants which may be employed include the partial esters of polyhydric alcohols with long chain carboxylic acids and esters of hydroxyalkyl ethers of polyhydric alcohols with long chain carboxylic acids. The long chain carboxylic acids are aliphatic carboxylic acids and contain between 12–18 carbon atoms. Particular compounds include glycerol mono-oleate, sorbitan mono-oleate, pentaerythritol mono-oleate, propylene glycol mono-stearate, glycerol mono-ricinoleate, sorbitol mono-palmitate, the pentaerythritol ammono-ester of soybean fatty acids, sorbide mono-laurate, glycerol mono-stearate, sorbitan tri-oleate, butylene glycol mono-laurate and mannitan di-laurate.

Suitable oil soluble surfactants include the sulfonates, sulfates, phenylic compounds, organic phosphorus compounds, phosphorus sulfide treated olefins, and metal soaps of carboxylic acids. Included among the sulfonates are the alkali metal and alkaline earth metal soaps of alkyl sulfonic acid, alkaryl sulfonic acid, and mahogany sulfonic acids. Other sulfonates which may be employed include mono- and poly-wax substituted naphthalene sulfonates, diphenyl ether sulfonates, naphthalene disulfide sulfonates, diphenyl amine sulfonates, dilauryl beta-naphthol sulfonates, dicapryl nitro-naphthalene sulfonates, unsaturated paraffin wax sulfonates, hydroxy substituted paraffin wax sulfonates, tetra-amylene sulfonates, mono- and poly-chlorosubstituted paraffin wax sulfonates, nitrosoparaffin wax sulfonates; cycloaliphatic sulfonates such as lauryl-cyclo-hexyl sulfonates, mono- and poly-wax substituted cyclo-hexyl sulfonates.

The phenolic organic compounds which may be used as surfactants are the free oil-soluble phenolic compounds or their phenates. These compounds, to be suitably oil-soluble, should contain at least nine aliphatic carbon atoms. Specific examples are: 3,5,5-tri-methyl-n-hexyl phenol, n-decyl phenols, cetyl phenols and nonyl phenols; alkaryl substituted phenols such as alkyl-phenyl phenols; polyhydroxy alkyl-aromatic compounds such as 20-carbon alkyl resorcinol, or polyhydroxy alkyl-benzenes, such as, for example, octyl catechol, and tri-iso-butyl pyrogallol;

mono-hydroxy alkyl-naphthalenes such as 12-carbon alkyl alpha naphthol. Iso amyl or nonyl phenol disulfide and other alkyl substituted phenol sulfides containing at least 5-alkyl carbon atoms may be employed.

Useful organic phosphorus compounds include tri- and penta-valent organic phosphorus acids and the corresponding thiophosphorus acids and their oil-soluble salts, as, for example, phosphoric acids and thiophosphoric acids, phosphinic acids and thiophosphinic acids, and the like and the oil-soluble salts thereof. The organic radicals substituted may be aliphatic, cycloaliphatic, aromatic, substituted aromatic, and the like and preferably contain a total of at least about 12 carbon atoms. Suitable phosphoric acid compounds include, for example, mono-wax phosphorus acids, mono-octadecyl phosphorus acid, mono-dodecyl phosphorus acid, methyl cyclohexyl phosphite, capryl phosphite, dicapryl phosphite, zinc monowaxbenzene phosphonate, zinc dodecyl benzene phosphonate, and the like. Useful organic thiophosphorus acids include dicapryl dithiophosphoric acids, dilauryl dithiophosphoric acids, di-(methyl cyclohexyl) dithiophosphorus acids, lauryl monothiophosphoric acids, diphenyl dithiophosphoric acids, ditolyl monothiophosphoric acids, di-(isopropyl-phenyl) monothiophosphoric acids, and the oil-soluble salts thereof.

The phosphorus sulfide treated olefins and their oil-soluble metal salts which are suitable for use include those customarily used in lubricating oil formulations as corrosion inhibitors and/or detergents. Specifically, they include the potassium-polyisobutylenephosphorus sulfide products described by U.S. Patent 2,316,080 issued on April 6, 1943, to Loane and Gaynor and a similar material containing no metal made by addition of a phosphorus sulfide to wax olefins as described in U.S. Patent 2,516,119 issued on July 25, 1950, to Hersh. This latter material is made by first forming wax olefins from paraffin waxes by halogenation and dehydrohalogenation and subsequently treating the olefins with a phosphorus sulfide, preferably phosphorus pentasulfide.

Examples of specific soaps which may be employed include metal soaps of naphthenic acids and the higher fatty acids.

Suitable naphthenic acids include substituted cyclopentane mono- and di-carboxylic acids and cylohexane mono- and di-carboxylic acids having at least about 15 carbon atoms for oil solubility, for example, cetyl cyclohexane carboxylic acids, dioctyl cyclopentane carboxylic acids; and dilauryl deca-hydronaphthalene carboxylic acids, and the like, and oil-soluble salts thereof.

The following examples will be illustrative of the invention.

*Example 1*

A core sample was taken from a subterranean formation containing petroleum oil. The formation was wetted with the petroleum oil. The formation also contained water. As a first step, the permeability of the core sample to crude petroleum oil was determined. For this purpose, the crude petroleum oil was flowed through the core sample at a pressure gradient at 2.5 pounds per square inch per inch. The equilibrium permeability of the core sample to the crude oil was 44 millidarcies at a water saturation of the core sample of 37 percent by volume. The core sample was then treated by passing through it a solvent having mutual solubility for oil and water, namely, tertiary butyl alcohol. Approximately 10 pore volumes of this solvent were passed through the core sample. Next, water was passed through the core sample. Approximately 10 pore volumes of water were employed and the water contained sodium chloride in the concentration of five percent by weight. Following the treatment of the core sample with water, the permeability of the core sample to crude petroleum oil was again determined. For this determination, the same type of crude petroleum oil was used as before and the pressure gradient was also the same. The equilibrium permeability of the core sample was now 300 millidarcies at a water saturation at about 31 percent by volume.

*Example 2*

This example will compare the effects of employing a single solvent having mutual solubility for oil and water and of employing a mixture of such solvents.

A core sample taken from a subterranean formation was oil-wet and contained water. The permeability of this core sample to crude petroleum oil was determined as described in Example 1. The core sample was then treated by passing through it one pore volume of a mixture containing equal volumes of ethylene glycol monobutyl ether and ethylene glycol monomethyl ether and thereafter 10 pore volumes of water containing five percent by weight of sodium chloride. The permeability of the core sample to crude petroleum oil was again measureed. The permeability to crude petroleum oil was now six fold its original value.

A similar core sample was treated by passing through it successively larger amounts of ethylene glycol monobutyl ether followed by water containing five percent by weight of sodium chloride. Following treatment, the permeability of the core sample to crude petroleum oil was measured. It was only when three pore volumes of the ethylene glycol monobutyl ether followed by 10 pore volumes of the water containing sodium chloride had been passed through the core sample did the permeability increase to six times its original value.

Having thus described our invention, it will be understood that such description has been given by way of illustration and not by way of limitation, reference for the latter purpose being had to the appended claims.

We claim:

1. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising injecting a mixture of ethylene glycol monobutyl ether and ethylene glycol monomethyl ether into said formation through said well borehole and injecting liquid water into said formation through said well borehole, thereafter producing petroleum oil from said formation through said well borehole, and recovering said produced petroleum oil from said well borehole.

2. The process of claim 1 wherein said water injected into said formation through said well borehole contains dissolved therein a flocculent for clay.

3. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising injecting liquid water into said formation through said well borehole, thereafter injecting a mixture of ethylene glycol monobutyl ether and ethylene glycol monomethyl ether into said formation through said well borehole, thereafter producing petroleum oil from said formation through said well borehole, and recovering said produced petroleum oil from said well borehole.

4. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising injecting a mixture of liquid water, ethylene glycol monobutyl ether, and ethylene glycol monomethyl ether into said formation through said well borehole, thereafter producing petroleum oil from said formation through said well borehole, and recovering said produced petroleum oil from said well borehole.

5. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising injecting a mixture of ethylene glycol monobutyl ether and ethylene glycol monomethyl ether into said formation through said well borehole, thereafter injecting liquid water into said formation through said well borehole, thereafter producing petroleum oil from said formation through said well borehole, and recovering said produced petroleum oil from said well borehole.

6. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising injecting a mixture of ethylene glycol monobutyl ether and ethylene glycol monomethyl ether into said formation through said well borehole and injecting liquid water containing dissolved therein a surfactant into said formation through said well borehole, thereafter producing petroleum oil from said formation through said well borehole, and recovering said produced petroleum oil from said well borehole.

7. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising injecting a mixture of ethylene glycol monobutyl ether and ethylene glycol monomethyl ether containing dissolved therein a surfactant into said formation through said well borehole and injecting liquid water into said formation through said well borehole, thereafter producing petroleum oil from said formation through said well borehole, and recovering said produced petroleum oil from said well borehole.

8. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising injecting a mixture of at least two solvents having mutual solubility for oil and water into said formation through said well borehole and injecting liquid water into said formation through said well borehole, thereafter producing petroleum oil from said formation through said well borehole, and recovering said produced petroleum oil from said well borehole.

9. A process for the treatment of a subterranean formation provided with a well borehole leading thereto from the surface of the earth, said formation being productive of petroleum oil to said well borehole and containing an oil phase and a water phase to render said formation water wet and to increase the flow capacity of said formation to petroleum oil and the flow of petroleum oil to said well borehole comprising preliminarily treating said formation by initially injecting a liquid consisting of a liquid having particular solubility for petroleum oil and petroleum oil derivatives into said formation through said well borehole leading thereto, thereafter injecting a solvent having mutual solubility for oil and water into said formation through said well borehole and injecting liquid water into said formation through said well borehole, and thereafter producing petroleum oil from said formation through said well bore hole and recovering the produced petroleum oil from said well borehole.

10. The process of claim 9 wherein said water injected into said formation through said well borehole contains dissolved therein a flocculent for clay.

11. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising preliminarily treating said formation by initially injecting a liquid consisting of a liquid having particular solubility for petroleum oil and petroleum oil derivatives into said formation through a well borehole leading thereto, injecting liquid water into said formation through said well borehole, thereafter injecting a solvent having mutual solubility for oil and water into said formation through said well borehole, thereafter producing petroleum oil from said formation through said well borehole, and recovering said produced oil from said well borehole.

12. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising preliminarily treating said formation by initially injecting a liquid consisting of a liquid having particular solubility for petroleum oil and petroleum oil derivatives into said formation through said well borehole leading thereto, thereafter, injecting a mixture of liquid water and a solvent having mutual solubility for oil and water into said formation through said well borehole, thereafter producing petroleum oil from said formation through said well borehole, and recovering said produced petroleum oil from said well borehole.

13. A process for the treatment of a subterranean formation provided with a well borehole leading thereto from the surface of the earth, said formation being productive of petroleum oil to said well borehole and containing an oil phase and a water phase to render said formation water-wet and to increase the flow capacity of said formation to petroleum oil and the flow of petroleum oil to said well borehole comprising preliminarily treating said formation by initially injecting a liquid consisting of a liquid having particular solubility for petroleum oil and petroleum oil derivatives into said formation through said well borehole leading thereto, thereafter injecting a solvent having mutual solubility for oil and water into said formation through said well borehole, thereafter injecting liquid water into said formation through said well borehole, thereafter producing petroleum oil from said formation through said well borehole, and recovering said produced petroleum oil from said well borehole.

14. A process for the treatment of a subterranean formation provided with a well borehole leading thereto from the surface of the earth, said formation being productive of petroleum oil to said well borehole and containing an oil phase and a water phase, to render said formation water-wet and to increase the flow capacity of said formation to petroleum oil and the flow of petroleum oil to said well borehole comprising preliminarily treating said formation by initially injecting a liquid consisting of a liquid having particular solubility for petroleum oil and petroleum oil derivatives into said formation through said well borehole leading thereto, thereafter injecting a mixture of at least two solvents having mutual solubility for oil and water into said formation through said well borehole and injecting liquid water into said formation through said well borehole, thereafter producing petroleum oil from said formation through said well borehole, and recovering said produced petroleum oil from said well borehole.

15. A process for the treatment of a subterranean formation provided with a well borehole leading thereto from the surface of the earth, said formation being productive of petroleum oil and petroleum oil derivatives to said well borehole and containing an oil phase and a water phase, to render said formation water-wet and to increase the flow capacity of said formation to petroleum oil and the flow of petroleum oil to said well borehole comprising preliminarily treating said formation by initially injecting a liquid consisting of a liquid having particular solubility for petroleum oil and petroleum oil derivatives into said formation through said well borehole leading thereto, thereafter injecting a solvent having mutual solubility for oil and water into said formation through said well borehole and injecting liquid water containing dissolved therein a surfactant into said formation through said well borehole, thereafter producing petroleum oil from said formation through said well borehole and recovering said produced petroleum oil from said well borehole.

16. A process for the treatment of a subterranean formation provided with a well borehole leading thereto from the surface of the earth, said formation being productive of petroleum oil through said well borehole and containing an oil phase and a water phase, to render said formation water-wet and to increase the flow capacity of said formation to petroleum oil and the flow of petroleum oil to said well borehole comprising preliminarily treating said formation by initially injecting a liquid consisting of a liquid having particular solubility for petroleum oil and petroleum oil derivatives into said formation through said well borehole leading thereto, thereafter injecting a solvent having mutual solubility for oil and water and containing dissolved therein a surfactant into said formation through said well borehole and injecting liquid water into said formation through said well borehole, thereafter producing petroleum oil from said formation through said well borehole, and recovering said produced petroleum oil from said well borehole.

References Cited in the file of this patent

UNITED STATES PATENTS

| | | |
|---|---|---|
| 2,262,428 | Lietz | Nov. 11, 1941 |
| 2,267,548 | Berl | Dec. 23, 1941 |
| 2,281,801 | Reynolds et al. | May 5, 1942 |
| 2,742,089 | Morse et al. | Apr. 17, 1956 |
| 2,779,418 | Garst | Jan. 29, 1957 |
| 2,841,222 | Smith | July 1, 1958 |

UNITED STATES PATENT OFFICE
CERTIFICATE OF CORRECTION

Patent No. 3,131,759                                                        May 5, 1964

Marion L. Slusser et al.

It is hereby certified that error appears in the above numbered patent requiring correction and that the said Letters Patent should read as corrected below.

Column 1, line 54, for "oid" read -- oil --; line 71, for "collected" read -- collect --; column 3, line 2, for "surface" read -- surfaces --; line 5, for "manual" read -- mutual --; column 4, line 31, for "on" read -- one --; column 9, line 44, for "cylohexane" read -- cyclohexane --; column 10, lines 17 and 18, for "measureed" read -- measured --.

Signed and sealed this 8th day of September 1964.

(SEAL)
Attest:

ERNEST W. SWIDER                                                EDWARD J. BRENNER
Attesting Officer                                                   Commissioner of Patents